No. 641,890. Patented Jan. 23, 1900.
D. W. PROSSER.
ELECTRIC FOOT BATTERY.
(Application filed Nov. 6, 1899.)
(No Model.)
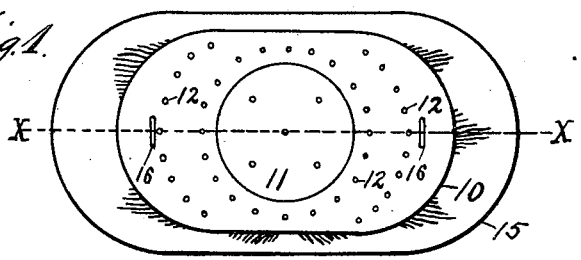
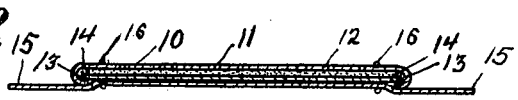
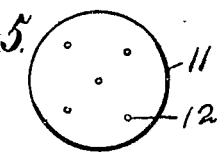
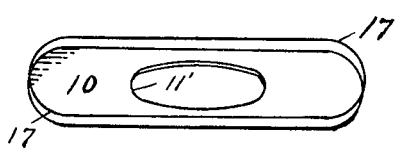
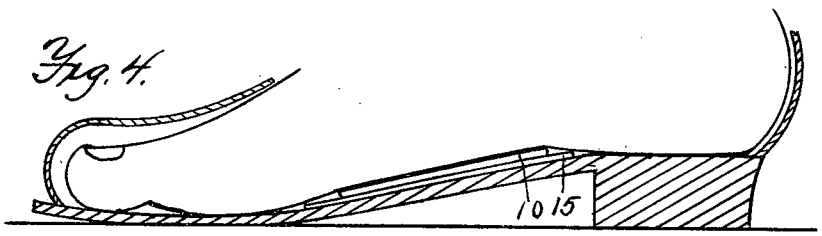
Witnesses
L. J. Baldwin
Frank C Eaton
Inventor
David W. Prosser.
By his attorneys
Harris V Baldwin
THE NORRIS PETERS CO., PHOTO-LITHO., WASHINGTON, D. C.

UNITED STATES PATENT OFFICE.

DAVID W. PROSSER, OF JAMESTOWN, NEW YORK.

ELECTRIC FOOT-BATTERY.

SPECIFICATION forming part of Letters Patent No. 641,890, dated January 23, 1900.

Application filed November 6, 1899. Serial No. 736,071. (No model.)

*To all whom it may concern:*

Be it known that I, DAVID W. PROSSER, a citizen of the United States, and a resident of Jamestown, in the county of Chautauqua and State of New York, have invented a new and useful Improvement in Electric Foot-Batteries, of which the following is a specification.

My invention relates to electric body-batteries in which the metals are so combined that the heat and moisture from the body cause them to act as a battery, and an additional excitant is often added to make the battery more powerful.

The objects of my improvement are, first, to make a better distributing agent for the electricity by using a silver plate with the copper and zinc plates heretofore used; second, to improve the action of the battery by perforating the plates with small openings that the moisture may get at the metals and excitant more quickly and thoroughly, and, third, a means for quick and sure attachment to the shoe. I attain these objects as shown in the accompanying drawings, in which—

Figure 1 is a plan view of the upper side of my battery. Fig. 2 is a sectional view at line X X in Fig. 1. Fig. 3 is a detail view of the under side of the copper plate with the edge turned as before putting in the excitant and zinc plate. Fig. 4 is a part-sectional view of the lower part of shoe and foot, showing the manner of using my battery. Fig. 5 is a detail view of silver plate.

In the drawings similar numerals refer to similar parts.

10 is the copper plate, and 11 the silver plate, which fits into and is soldered to the copper plate.

12 12 are the perforations in the plates.

13 is the zinc plate, which is usually perforated like plates 10 and 11.

14 is the excitant, which is placed between the lower plate 13 and the upper plates 10 11, and for which either blue vitriol or other excitant compounds may be used, either pure in the powdered form or after having been triturated with some substance to reduce the strength of the battery, as desired.

15 is a piece of leather or cloth attached to the under side of the battery by wire stays 16 16, and the under side of piece 15 is covered with cement, by which it can be easily and quickly attached to the inner sole of the shoe under the hollow of the foot, as shown in Fig. 4.

I usually make my battery by stamping out plates 10 11 13 with dies, plate 10 having an opening 11' cut for plate 11, and the edge 17 of plate 10 is turned, as shown in Fig. 3. The plates are perforated, and plate 11 is fastened in plate 10, which is then placed as shown in Fig. 3 and the excitant put therein and zinc plate 13 placed over it and the edges turned down, holding all fast. Piece 15 is then attached by stays 16 16, as shown.

I find that the silver, copper, and zinc plates will be excited by the salts of the perspiration of the body and that this is sufficient for a mild battery; but I usually prefer to place the stronger excitant between the plates, as stated and shown.

I find silver to be a better conductor for electricity than copper, as well as a better electromotive in its action with the positive or zinc plate, and have therefore placed the silver in the center of the upper or negative plate for the concentration of the current that the battery power may be the highest at the center on account of its action on the nerve-center in the bottom of the foot.

I claim as new—

1. An electrical foot-battery consisting of a perforated compound silver and copper upper or negative plate, a zinc under or positive plate held by said compound plate, substantially as shown and described and for the purpose set forth.

2. An electric foot-battery consisting of a perforated compound silver and copper upper or negative plate, a zinc under or positive plate held by said compound plate, an excitant placed between said plates to act on the metals, as shown and for the purpose specified.

3. An electric foot-battery consisting of a compound silver and copper upper or negative plate, a zinc under or positive plate held by said compound plate, an excitant placed between said plates, openings in said plates to admit moisture, a piece of flexible material attached to the under side of the plates having cement on its under side for attaching to the shoe-sole, substantially as shown and described and for the purpose set forth.

In testimony whereof I have subscribed my name to this specification in the presence of two subscribing witnesses.

DAVID W. PROSSER.

In presence of—
H. C. EDDY,
N. E. THOMAS.